United States Patent
Kabeshita et al.

(10) Patent No.: US 9,064,060 B2
(45) Date of Patent: Jun. 23, 2015

(54) METHOD AND SYSTEM FOR DEVELOPING A GOLF BALL CONSTRUCTION

(75) Inventors: Yutaka Kabeshita, Portland, OR (US); Nicholas A. Leech, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 155 days.

(21) Appl. No.: 13/559,345

(22) Filed: Jul. 26, 2012

(65) Prior Publication Data

US 2013/0190904 A1    Jul. 25, 2013

Related U.S. Application Data

(60) Provisional application No. 61/512,583, filed on Jul. 28, 2011.

(51) Int. Cl.
| | | |
|---|---|---|
| A63F 13/10 | (2006.01) | |
| G06F 17/40 | (2006.01) | |
| A63B 37/00 | (2006.01) | |
| A63B 45/00 | (2006.01) | |

(52) U.S. Cl.
CPC ............ *G06F 17/40* (2013.01); *A63B 37/0003* (2013.01); *A63B 45/00* (2013.01); *A63B 2220/00* (2013.01); *A63B 2220/20* (2013.01); *A63B 2220/30* (2013.01); *A63B 2220/35* (2013.01); *A63B 2220/805* (2013.01); *A63B 2220/806* (2013.01); *A63B 2220/807* (2013.01); *A63B 2220/808* (2013.01); *A63B 2220/89* (2013.01)

(58) Field of Classification Search
USPC .............................................. 463/3; 473/223
See application file for complete search history.

(56) References Cited

U.S. PATENT DOCUMENTS

| | | |
|---|---|---|
| 4,375,887 A | 3/1983 | Lynch et al. |
| 5,766,097 A | 6/1998 | Horiuchi et al. |
| 5,967,906 A | 10/1999 | Horiuchi et al. |
| 6,086,487 A | 7/2000 | Morgan et al. |
| 6,672,978 B1 | 1/2004 | Morgan et al. |
| 6,794,447 B1 | 9/2004 | Kim et al. |
| 7,384,352 B2 | 6/2008 | Ohama et al. |
| 7,396,301 B2 | 7/2008 | Ohama et al. |
| 7,410,430 B2 | 8/2008 | Isogawa et al. |
| 7,908,907 B1 | 3/2011 | Nelson et al. |
| 2002/0022531 A1 | 2/2002 | Katayama |
| 2002/0152796 A1 | 10/2002 | Katayama |
| 2003/0176988 A1 | 9/2003 | Boehm et al. |
| 2004/0006442 A1 | 1/2004 | Boehm |

(Continued)

FOREIGN PATENT DOCUMENTS

| | | |
|---|---|---|
| JP | 2002000787 | 1/2002 |
| JP | 2006031430 | 2/2006 |
| KR | 10-2007-0106850 | 11/2007 |

OTHER PUBLICATIONS

International Search Report and Written Opinion in PCT Application No. PCT/US2012/048520, mailed on Jan. 30, 2013.

*Primary Examiner* — Pierre E Elisca
(74) *Attorney, Agent, or Firm* — Honigman Miller Schwartz and Cohn LLP

(57) ABSTRACT

A method and system determine a plurality of golf ball construction characteristics that constitute a golf ball construction. Each of the plurality of golf ball construction characteristics is determined on the basis of at least a measurement related to a golf shot parameter value obtained from samples of a specific golfer's golf swing. Accordingly, the golf ball construction may be custom-fit to golf swings of a specific golfer.

19 Claims, 16 Drawing Sheets

(56) References Cited

U.S. PATENT DOCUMENTS

| | | |
|---|---|---|
| 2006/0030422 A1 | 2/2006 | Rankin et al. |
| 2007/0244667 A1 | 10/2007 | Ligotti, III et al. |
| 2008/0039236 A1 | 2/2008 | Isogawa et al. |
| 2009/0054175 A1 | 2/2009 | Isogawa et al. |
| 2009/0054176 A1 | 2/2009 | Isogawa et al. |
| 2009/0082137 A1 | 3/2009 | Okabe |
| 2011/0009215 A1 | 1/2011 | Ichikawa et al. |
| 2014/0221115 A1* | 8/2014 | Swartz et al. ............ 473/219 |
| 2014/0274458 A1* | 9/2014 | Kronenberg et al. ...... 473/342 |
| 2014/0274459 A1* | 9/2014 | Kronenberg et al. ...... 473/342 |

* cited by examiner

METHOD AND SYSTEM FOR DEVELOPING A GOLF BALL CONSTRUCTION

CROSS-REFERENCE TO RELATED APPLICATION

This application claims priority under 35 U.S.C. §119(e) to U.S. Provisional Patent Application No. 61/512,583, entitled "Method And System For Developing A Golf Ball Design," and filed on Jul. 28, 2011, which application is hereby incorporated by reference.

BACKGROUND

1. Field of the Invention

The present invention relates generally to a method and system for determining customized golf ball constructions based upon golf shot parameter values.

2. Description of Related Art

With advances in golf ball construction, and increasing awareness and proliferation of golf equipment designed for particular levels of play, there has been increased interest in matching a golfer with an appropriate golf ball. While golf club fitting has become well known and a routine service of golf pro shops, golf ball fitting is a newer process, with much still being done for the most part by a golf pro or fitter posing a series of questions to the golfer, sometimes in the form of a golf ball fitting survey. The questions are generally about a golfer's average score, handicap, their goals for their game, and their wishes for the oft times contradictory goals of control, distance, workability of the golf ball. Once the questions have been answered, the golf pro or fitter will consider the necessary compromises and recommend a commercially-available golf ball for the player. In some golf ball fitting surveys, consideration may be given to anticipated playing conditions such as green speeds, firmness of the turf, altitude, climate and atmospheric conditions on a given course.

The question and answer process described above is purely subjective and does not take much measurable criteria into account. Recent developments in golf ball fitting have addressed some of the shortcomings of a purely subjective question and answer process by having a golfer take swings at a ball while being monitored by launch monitors, video devices, and other measuring devices. The measurements generally taken may relate to club head speed, ball speed, launch angle, attack angle, backspin, sidespin, and total distance.

Meanwhile, some golfers have been in a position to benefit from golf balls that have been custom-tailored to their particular skills as a golfer. For example, highly skilled golfers such as professional athletes may either commission an expert or have an expert commissioned on their behalf to create a customized golf ball construction wherein the golf ball construction is judged by the expert to be particularly suited to the golfer's style of play. The process involved in determining such custom golf ball constructions may have subjective components as well as objective components (i.e., components based upon the sorts of measurable criteria described above). The process involved in determining such custom golf ball constructions may also be heavily dependent upon the judgment of experts, whose time or services may be scarce, or expensive, or both.

Recent developments have made the manufacture of custom-designed golf balls more feasible. Accordingly, increasing numbers of golfers seek to extend their golf ball purchases beyond the range of commercially-available or otherwise off-the-shelf golf balls and into custom-designed golf balls. However, the custom designing of golf balls may still be constrained by the limited availability of experts, the expense of experts, or both.

There is a need in the art for a method and system for determining customized golf ball constructions that addresses the shortcomings of the prior art discussed above. Specifically, there is a need for a method and system to reduce or eliminate the need for expert judgment in determining a custom golf ball construction. Similarly, there is a need to correlate various characteristics of a golf ball construction with measurable criteria to reduce or eliminate the need for the deep knowledge or experience of a golf pro or fitter in determining the custom golf ball construction. Accordingly, there is a need to automate the process of determining a custom golf ball construction, from gathering data with respect to measurable criteria to using that gathered data to determine in a custom-fit way the various characteristics of a golf ball construction.

SUMMARY

In one aspect, the invention provides a method for specifying a golf ball construction to be executed by a computer. In one step, the method includes obtaining a plurality of golf shot parameter values. In another step, the method includes calculating a range of values for each of a plurality of golf ball construction characteristics, the calculation of each range of values being based upon a corresponding value from the plurality of golf shot parameter values. In another step, the method includes combining the range of values for each of the plurality of golf ball construction characteristics to delimit a range of golf ball construction. In another step, the method includes inputting a golf ball construction preference. In another step, the method includes reducing the range of golf ball constructions based upon the golf ball construction preference.

In another aspect, the invention provides a golf ball design system for a computer. The system includes a database for storing a plurality of golf shot parameter values. The system also includes a first automated measurement device for obtaining a first measurement related to a first golf shot parameter value. The system additionally includes a first input device for inputting the first measurement. The system further includes a first determining device for determining a range of values for a first golf ball construction characteristic based upon the first measurement. The system also includes a second automated measurement device for obtaining a second measurement related to a second golf shot parameter value. The system additionally includes a second input device for inputting the second measurement. The system further includes a second determining device for determining a range of values for a second golf ball construction characteristic based upon the second measurement. Moreover, the system includes a delimiting device for delimiting a range of golf ball constructions based upon the range of values for the first golf ball construction characteristic and the range of values for the second golf ball construction characteristic. The system furthermore includes an output device for outputting the range of golf ball constructions.

In a further aspect, the invention provides a method for specifying a range of golf ball constructions to be executed by a computer. In one step, the method includes obtaining a plurality of golf shot parameter values. In another step, the method includes calculating a range of values for a first golf ball construction characteristic based upon a first value of the plurality of golf shot parameter values. In another step, the method includes calculating a range of values for a second golf ball construction characteristic based upon a second value of the plurality of golf shot parameter values. In another step, the method includes combining at least the range of values for the first golf ball construction characteristic and the range of values for the second golf ball construction characteristic to delimit the range of golf ball constructions.

In yet another aspect, the invention provides a method for specifying a golf ball construction. In one step, the method includes gathering a plurality of golf shot parameter values. In another step, the method includes ascertaining a range of values for each of the plurality of golf ball construction characteristics, each range of values being based upon a corresponding value from the plurality of golf shot parameter values. In another step, the method includes specifying one or more golf ball construction preferences. In another step, the method includes determining the golf ball construction based upon (a) the range of values for each of the plurality of golf ball construction characteristics and (b) the one or more golf ball construction preferences.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
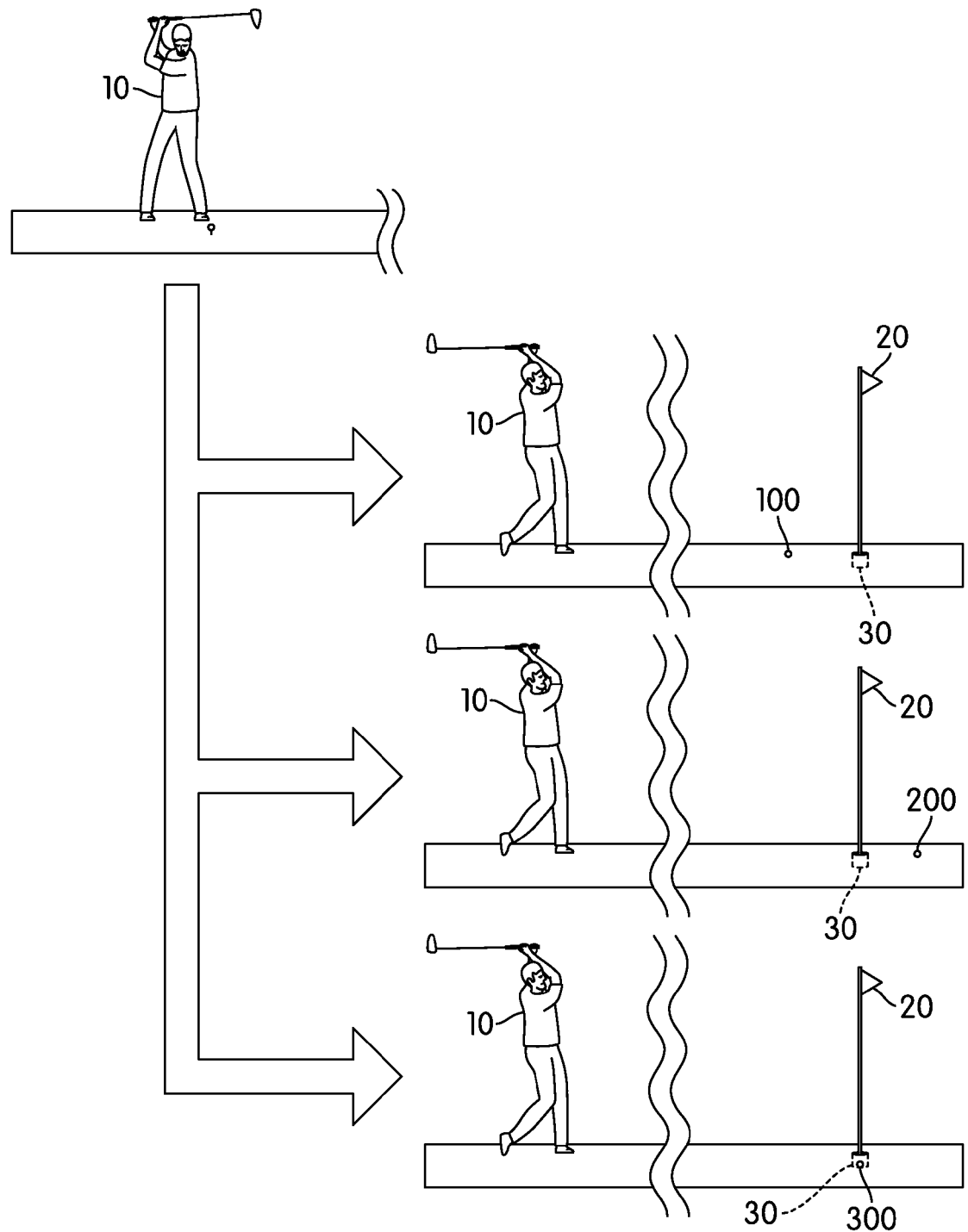
FIG. 1 depicts an embodiment of three golf balls.

In FIG. 1, a golfer 10 swings at three different golf balls in the course of making three different golf shots. Specifically, in three separate swings, golfer 10 swings at a first golf ball 100, a second golf ball 200, and a third golf ball 300. Through each swing, golfer 10 attempts to place each of balls 100, 200, and 300 at a target spot 20 at a particular position on a golf course. As depicted, target spot 20 is located at hole 30.

Each golf shot may in turn be affected by various golf shot parameters. Some golf shot parameters may be swing parameters, and may be influenced by the mechanics or specifics of a golfer's swing. Other golf shot parameters may be launch condition parameters, and may be influenced by both the golfer's swing mechanics and by the construction of a golf ball. Further golf shot parameters may be ball flight parameters, and may be influenced both by the construction of the golf ball and by environmental conditions.

Some swing parameters may include a swing speed, a club path, and an attack angle. The swing speed may be a club head speed. The club path may include a position of the club head, a face angle, or a loft, which may be measured statically at a particular time (such as the moment of impact or contact between ball and club) and with respect to a static or reference position (such as measuring loft and lie angles with respect to a golf club shaft in the vertical plane, for example). The club path may also include a path or direction of the club head, as represented for example by a multi-dimensional vector. The attack angle may be a multi-dimensional angle in a plane defined by a vertical reference direction and an intended or target direction.

Launch condition parameters may include a launch angle, a ball speed or initial velocity, a ball spin, an initial direction, or a ball spin slope. The ball spin may be either a backspin (i.e., a spin about a horizontal axis) or a sidespin (i.e., an angle of backspin relative to a horizontal plane). The initial direction may be an offline angle relative to an intended target direction.

Ball flight parameters may include parameters related to ball construction, such as dimple count, dimple configuration, and moment of inertia. Ball flight parameters may also include parameters related to environmental conditions, such as wind characteristics (i.e. wind speed and direction), elevation, relative humidity, and weather conditions (i.e. rain, sleet, hail, or snow).

Each of first golf ball 100, second golf ball 200, and third golf ball 300 has been manufactured in accordance with a corresponding golf ball construction. Each of the corresponding golf ball constructions differs from the others, and each specifies a number of golf ball construction characteristics. Pertinent golf ball construction characteristics may include, for example: the number of pieces or layers within the golf ball; the material (and hardness) of the golf ball's cover; the number of dimples in the golf ball's cover; and the thickness of the golf ball's cover. Other golf ball construction characteristics may include, for example: the shape, pattern, or other configuration of the dimples in the golf ball's cover; aesthetic considerations such as color or indicia; and other aspects of construction affecting the physical response of the golf ball to external stimulus. In turn, each golf ball construction characteristic specifies something about the nature of one or more portions of golf balls 100, 200, and 300.

Figure 2A:
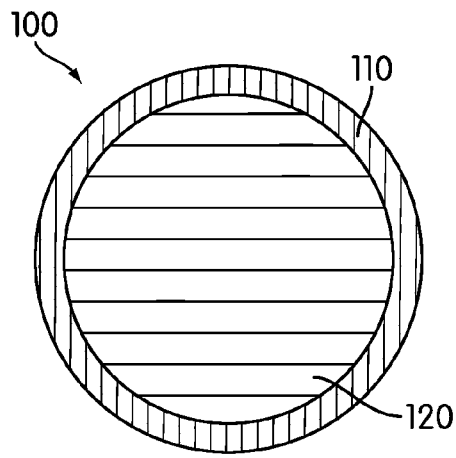
FIGS. 2A-2C are schematic cross-sectional views of the golf balls.
Figure 2B:
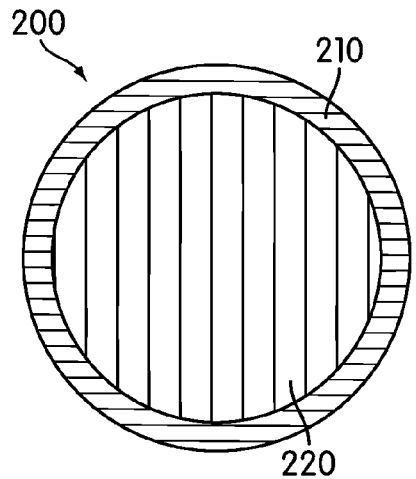
Figure 2C:
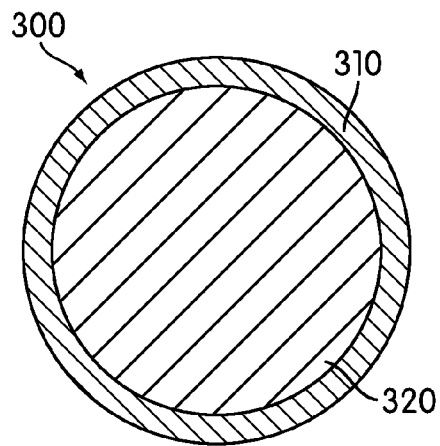

FIGS. 2A-2C are schematic cross-sectional views of golf balls 100, 200, and 300. As depicted in FIGS. 2A-2C, each of first golf ball 100, second golf ball 200, and third golf ball 300 includes a number of portions. First golf ball 100 includes cover portion 110 and inner portion 120, while second golf ball 200 includes cover portion 210 and inner portion 220, and third golf ball 300 includes cover portion 310 and inner portion 320.

Each piece or layer of the construction used for cover portions 110, 210, and 310 as well as for core portions 120, 220, and 320 may have physical characteristics, such as a thickness, and may be formed from any of a variety of materials. Each material used to form a piece or layer of the construction may in turn have physical characteristics such as density, and hardness, for example. Moreover, a physical characteristic of the material within a particular piece or layer of the construction may vary within that piece or layer. The physical characteristic of the material of the piece or layer may not be constant throughout the piece or layer, but may be vary as a function of, for example, a distance at each point within the material from the center of the golf ball. That is, the physical characteristic may be a gradient within the material.

Generally, for any arrangement of layers not specifically mentioned herein, any layer may be made of any material suitable for the purpose. Suitable known materials for use in a golf ball include thermoset materials, such as rubber, styrene butadiene, polybutadiene, isoprene, polyisoprene, certain types of polyurethanes, and trans-isoprene. Known materials also include thermoplastics, such as ionomer resins, polyamides or polyesters, and thermoplastic polyurethane elastomers. Suitable materials also include polyurea compositions, as well as other materials.

For example, a cover layer should be tough and resistant to scuffing while being soft enough for a golf club to impart spin easily to the ball. Thus, thermoplastic polyurethane (TPU) and thermoset polyurethane are suitable for use in cover layers, as are known highly neutralized polymers and other ionomers. Thermoplastic polyurethane that is not otherwise scuff resistant can be treated to harden the surface, such as by a surface treatment or by other treatments before, during, and/or after molding the layer. Suitable ionomers include members of the Surlyn® family of ionomeric polymers produced by E. I. DuPont de Nemours and Company and members of the Iotek® family of products produced by Exxon-Mobil Chemical Corporation. Additionally, other traditional materials for covers may also be used, such as balata.

Returning to FIG. 1, golfer 10 swings in substantially the same way in each of the three golf swings. That is, each of the three separate swings of golfer 10 is essentially the same as the others with respect to various golf shot parameters, and may be characterized as having essentially the same swing mechanics. Pertinent golf shot parameters may be swing parameters and launch condition parameters, and may include the swing speed, the ball speed, the ball spin, the ball spin slope, the launch angle, the attack angle, and the club path. Despite the similarities between the three swings, each of the differently-designed golf balls 100, 200, and 300 responds differently to the swing applied to it by golfer 10. For example, golf ball 100 has fallen short of target spot 20, while golf ball 200 has overshot and lies beyond target spot 20. Only golf ball 300 has been sunk in hole 30 at target spot 20.

In FIG. 1, the differing responses of golf balls 100, 200, and 300 to essentially the same golf swing (i.e., to golf swings having essentially the same swing mechanics) is due to the differing golf ball construction characteristics of golf balls 100, 200, and 300. In other words, golf balls 100, 200, and 300 respond differently given the same stimulus due to different underlying golf ball construction characteristics.

A golfer may be able to acquire golf shot parameter values associated with golf swings that the golfer may personally make, or associated with representative golf swings based upon a set of golf swings that the golfer may personally make. The golfer may then wish to determine constituent golf ball construction characteristics that will, when combined, result in a golf ball construction most suitable to helping the golfer place golf balls closer to target spots of the golfer's choosing. Such target spots may be holes on a golf course. Alternatively, such target spots may be more general in nature, corresponding with widely-applicable goals such as maximizing the distance of a hit or maximizing the straightness of a hit.

In other words, in the context of FIGS. 2A-2C, a golfer may wish to determine characteristics associated with the construction of various different portions of a golf ball in order to determine a desirable golf ball construction. Therefore, for example, the golf ball construction characteristics indicating (a) the material and hardness of a golf ball's cover, or (b) the number of dimples in the golf ball's cover, or (c) the thickness of the golf ball's cover may indicate various properties of cover portions 110, 210, and 310 of golf balls 100, 200, and 300. Alternatively, the golf ball construction characteristic indicating the number of pieces or layers within the golf ball may indicate how many pieces or layers exist in each of inner portions 120, 220, and 320 of golf balls 100, 200, and 300.

One method of determining construction characteristics associated with various different portions of a golf ball includes determining a single construction characteristic on the basis of a single golf shot parameter value. Under extensions of this method, each of a plurality of golf ball construction characteristics may be made dependent upon one of a plurality of golf shot parameter values. For example, a first golf ball construction characteristic may be made dependent upon a first golf shot parameter value, a second golf ball construction characteristic may be made dependent upon a second golf shot parameter value, and so on. Moreover, golf shot parameter values may be based upon more than a single measurement related to golf shot parameters. That is, a golf shot parameter value may be a composite value representing a combination of two or more measurements related to golf shot parameters, or may be based on a measurement related to a golf shot parameter and another data point, or may be based upon two or more measurements related to golf shot parameters.

In being made dependent upon a particular golf shot parameter value, a golf ball construction characteristic may have a single configuration or value, or may have any of a range of configurations or values. Where each of the constituent golf ball construction characteristics has a single configuration or value, there may be a particular (i.e., singular) golf ball construction that includes all the constituent golf ball construction characteristics. On the other hand, where one or more of the constituent golf ball construction characteristics has a range of configurations or values, there may be a range of golf ball constructions that includes all the constituent golf ball construction characteristics. Where there is a range of golf ball constructions that includes all the constituent golf ball characteristics that have been made dependent upon golf shot parameter values, another factor may be used to preferentially select a golf ball construction from the range of golf ball constructions.

Method and System

Figure 3:
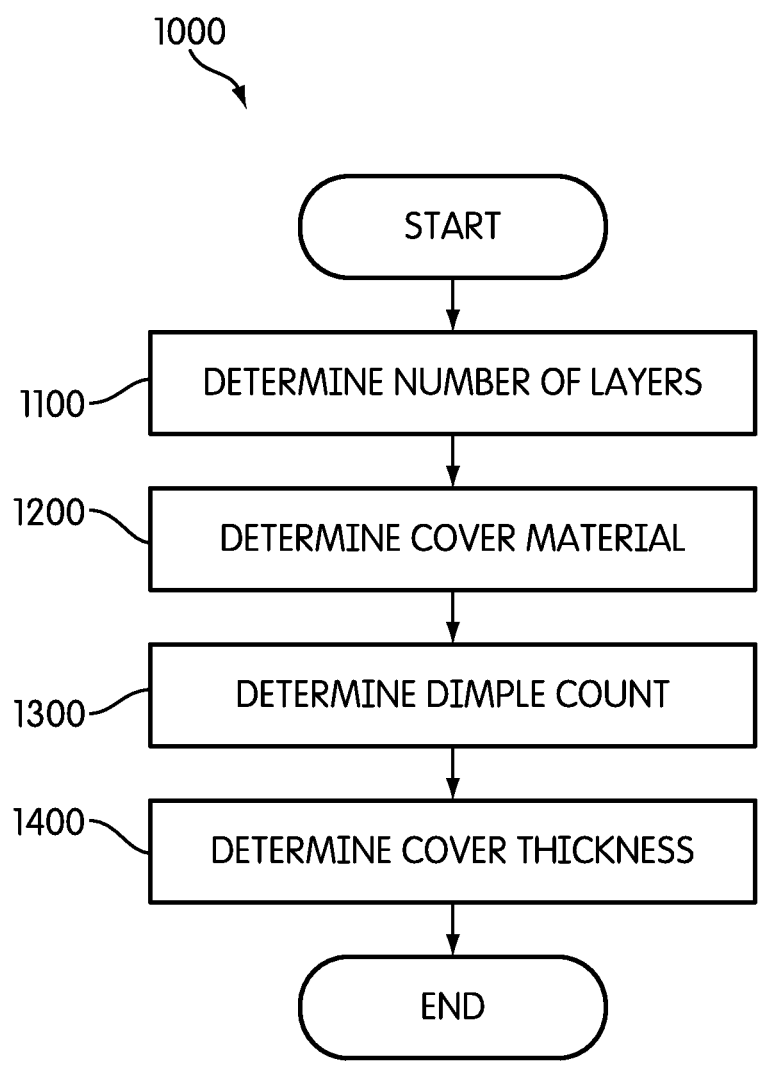
FIG. 3 is a flow diagram of a method for specifying a range of golf ball constructions.

FIG. 3 is a flow diagram of a method 1000 for specifying a range of golf ball constructions. In first step 1100, a first golf ball construction characteristic is determined. More specifically, first step 1100 determines a value or range of values for the number of pieces or layers within the golf ball. In second step 1200, a second golf ball construction characteristic is determined. More specifically, second step 1200 determines a list of materials of the golf ball's cover, in combination with a value or values of hardness for each material. In third step 1300, a third golf ball construction characteristic is determined. More specifically, third step 1300 determines a value or range of values for the number of dimples in the golf ball's cover. In fourth step 1400, a fourth golf ball construction characteristic is determined. More specifically, fourth step 1400 determines a value or range of values for the thickness of the golf ball's cover.

Figure 4:
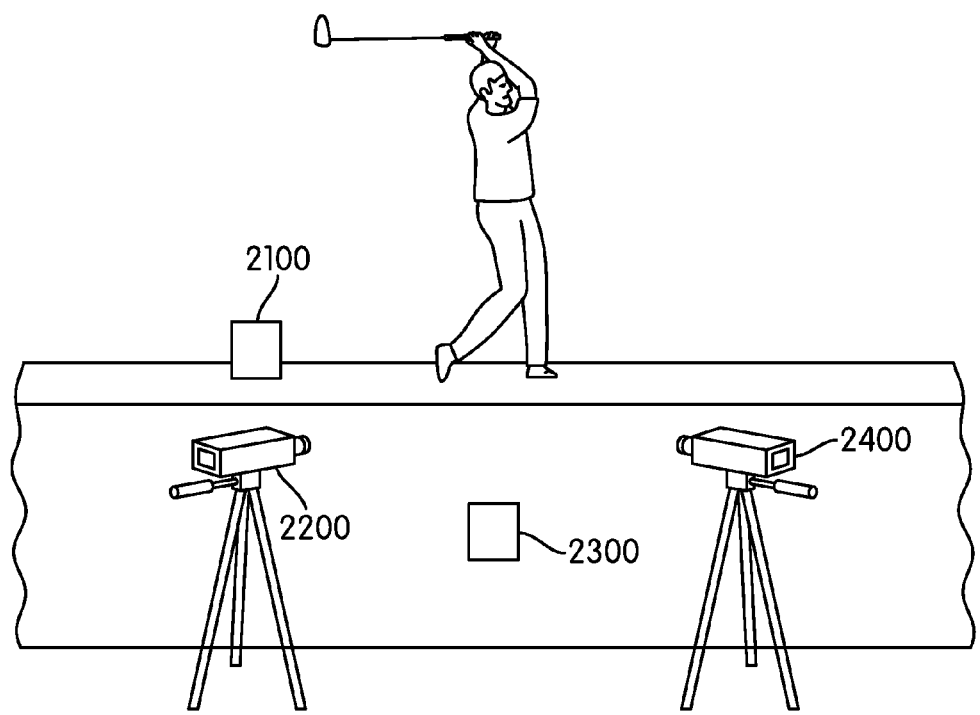
FIG. 4 depicts an embodiment of a system for gathering golf shot parameter measurements.

The various determinations of method 1000 are made using measurements related to various golf shot parameters. FIG. 4 depicts an embodiment of a system 2000 for gathering measurements related to various golf shot parameters. System 2000 includes measuring devices 2100, 2200, 2300, and 2400. First measuring device 2100 is used to gather measurements related to a first golf shot parameter. More specifically, measurements of first measuring device 2100 relate to a speed or velocity of the golf shot. Second measuring device 2200 is used to gather measurements related to a second golf shot parameter. More particularly, measurements of second measuring device 2200 relate to a spin of the golf ball, such as a backside spin. Third measuring device 2300 is used to gather measurements related to a third golf shot parameter. More particularly, measurements of third measuring device 2300 relate to the launch angle of a golf shot. Fourth measuring device 2400 is used to gather measurements related to a fourth golf shot parameter. More particularly, measurements of fourth measuring device 2400 relate to the attack angle of a golf shot.

Devices 2100, 2200, 2300, and 2400 may be any devices, such as photographic devices, launch monitors, sound monitors, or position-measuring devices, used to measure or otherwise capture information about various parameters associated with golf shots. For example, one or more of devices 2100, 2200, 2300, and 2400 may include a camera, a video camera, a light sensor, or another device measuring light. Additionally, one or more of devices 2100, 2200, 2300, and 2400 may include a radar device (e.g., doppler radar devices, devices that give information similar to doppler radar devices, and other radar devices), a sonar device, or another device measuring reflected energy. One or more of devices 2100, 2200, 2300, and 2400 may further include a receiving or transmitting device enabling intercommunication with a corresponding transmitting or receiving device, such as a device within a golf club or a golf ball. That is, in various configurations, devices 2100, 2200, 2300, and 2400 may include a variety of measurement equipment, sensing equipment, and communication equipment to allow devices 2100, 2200, 2300, and 2400 to obtain and communicate measurements related to golf shot parameters.

Figure 5:
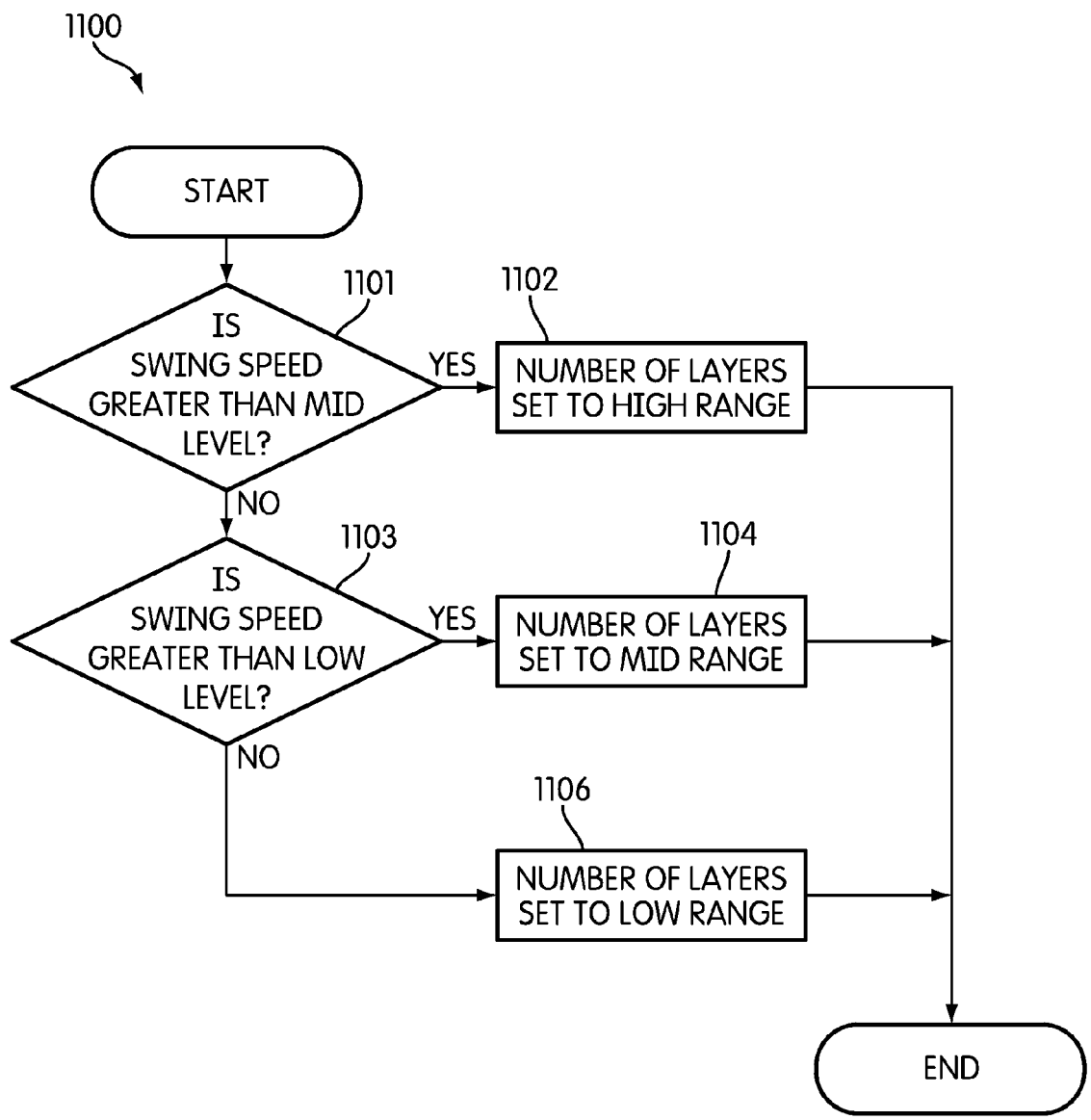
FIG. 5 is a flow diagram for a method of determining a number of layers for a golf ball construction.

FIG. 5 is a flow diagram for a method of determining a number of layers for a golf ball construction. In the depicted embodiment, first step 1100 includes a number of calculations based upon comparisons with a golf shot parameter value, such as a swing speed value, as well as a number of range-establishing steps on the basis of the calculations. The swing speed value is itself based at least upon a measurement related to a speed or a velocity of a golf shot, which may be gathered by one or more measuring devices.

In first calculation 1101, the swing speed value is compared with a mid level swing speed value. If the swing speed value exceeds the mid level swing speed value, the swing speed is treated as a high level swing speed. Accordingly, in first range establishment 1102, the range for the number of layers for the golf ball construction is set to a high range. If the swing speed value does not exceed the mid level swing speed value, then in second calculation 1103 the swing speed value is compared with a low level swing speed value. If the swing speed value exceeds the low level swing speed value, the swing speed is treated as a mid level swing speed. Accordingly, in second range establishment 1104, the range for the number of layers for the golf ball construction is set to a mid range. If the swing speed value does not exceed the low level swing speed value, the swing speed is treated as a low level swing speed. Accordingly, in third range establishment 1106, the range for the number of layers for the golf ball construction is set to a low range.

Figure 6A:
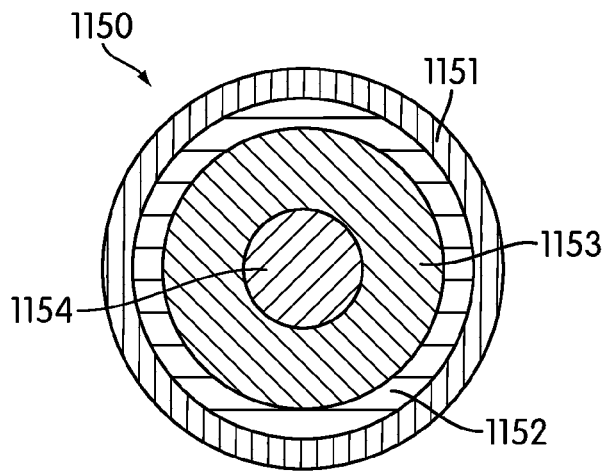
FIGS. 6A-6C are schematic cross-sectional views of golf balls having a variety of numbers of layers.
Figure 6B:
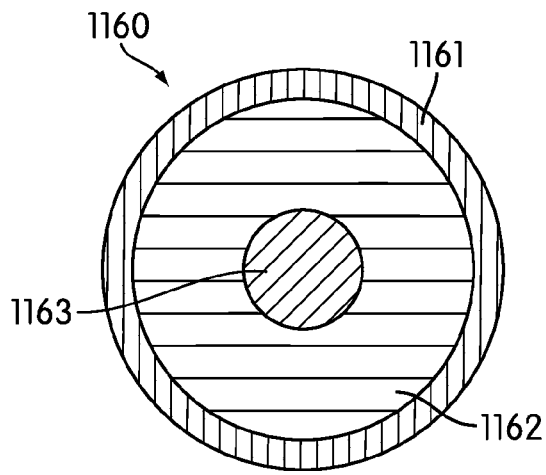
Figure 6C:
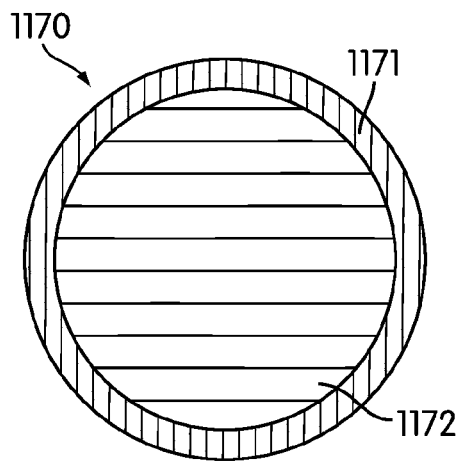

FIGS. 6A-6C are schematic cross-sectional views of golf balls having a variety of numbers of layers. Golf ball 1150 incorporates a four-piece or four-layer construction and includes first layer 1151, second layer 1152, third layer 1153, and fourth layer 1154. Golf ball 1160 incorporates a three-piece or three-layer construction and includes first layer 1161, second layer 1162, and third layer 1163. Golf ball 1170 incorporates a two-piece or two-layer construction and includes first layer 1171 and second layer 1172.

In some embodiments of first step 1100, the mid level swing speed value may be approximately 100 MPH (miles per hour), and the low level swing speed value may be approximately 90 MPH. In addition, the high range of the number of layers may be set to include four layers and three layers, the mid range of the number of layers may be set to include four layers, three layers, and two layers, and the low range of the number of layers may be set to include three layers and two layers.

Accordingly, in first step 1100, the range for the number of layers may be essentially set to include (a) four layers and three layers, such as in golf balls 1150 and 1160, for swing speed values above 100 MPH; (b) four layers, three layers, and two layers, such as in golf balls 1150, 1160, and 1170, for swing speed values between 100 MPH and 90 MPH; or (c) three layers and two layers, such as in golf balls 1160 and 1170, for swing speed values below 90 MPH.

Other embodiments of first step 1100 may include calculations based upon comparisons with respect to a different golf shot parameter value. For example, first step 1100 may include calculations based upon comparisons with a ball compression value, which may itself be based at least upon a measurement related to a ball compression gathered by one or more measuring devices. In such an embodiment, if the ball compression value does not exceed 2.7 in first calculation 1101, the number of layers for the golf ball construction may be set to the high range (i.e., may be set to include three layers or four layers). Alternatively, if the ball compression value does not exceed 3.3 in second calculation 1103, the number of layers for the golf ball construction may be set to a mid range (i.e., may be set to include two layers, three layers, or four layers). Otherwise, if the ball compression value is at least 3.3, the number of layers for the golf ball construction may be set to a low range (i.e., may be set to include two layers or three layers).

Figure 7:
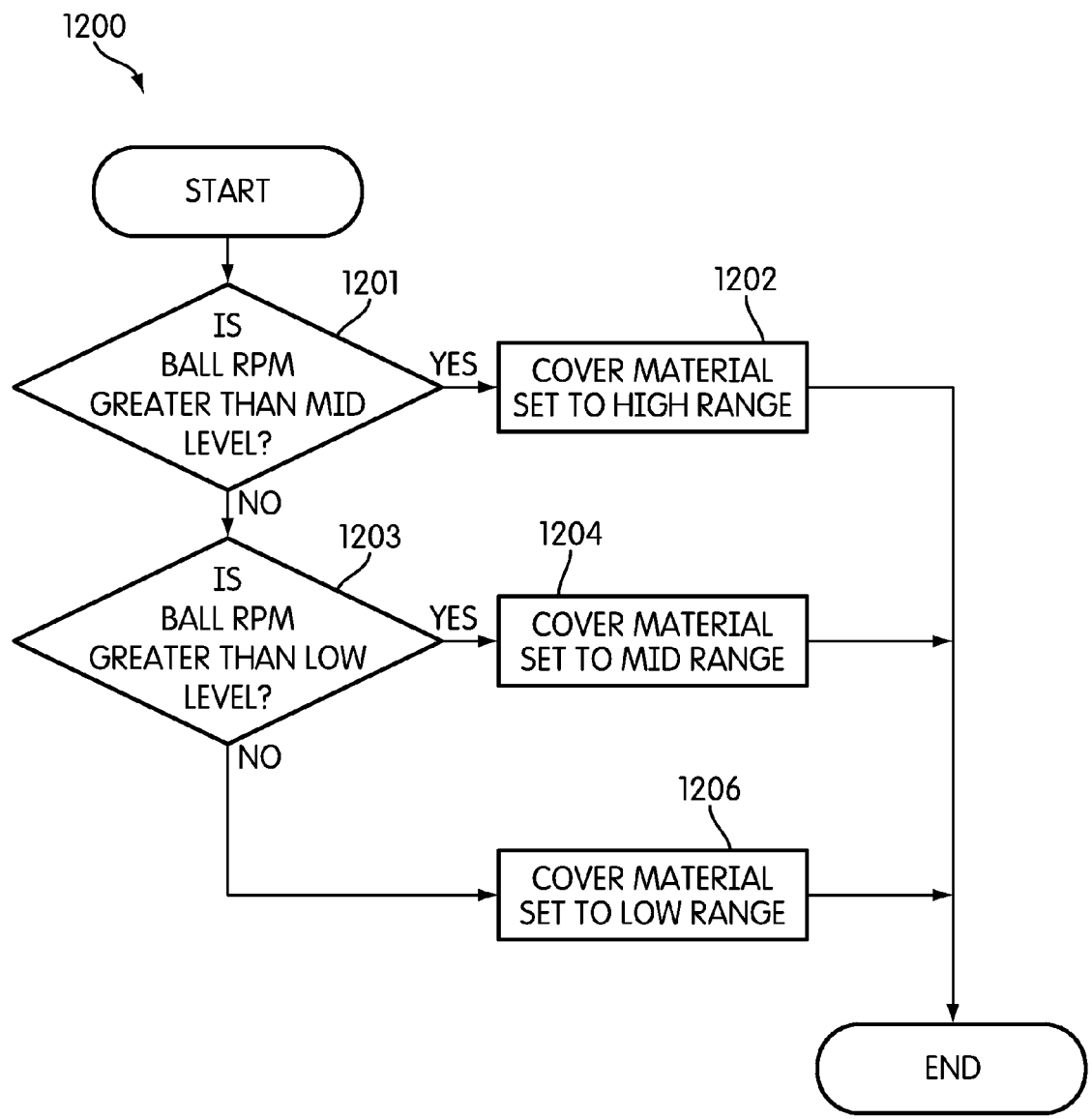
FIG. 7 is a flow diagram for a method of determining a cover hardness and a cover material.

FIG. 7 is a flow diagram for a method of determining a material and hardness of a golf ball cover for a golf ball construction. In the depicted embodiment, second step 1200 includes a number of calculations based upon comparisons with a golf shot parameter value, such as a ball spin value, as well as a number of range-establishing steps on the basis of the calculations. The ball spin value is itself based at least upon a measurement related to a spin of a golf ball, which may be gathered by one or more measuring devices.

In first calculation 1201, the ball spin value is compared with a mid level ball spin value. If the ball spin value exceeds the mid level ball spin value, the ball spin is treated as a high level ball spin. Accordingly, in first range establishment 1202, the list of materials of the golf ball's cover is set to a high range. If the ball spin value does not exceed the mid level ball spin value, then in second calculation 1203 the ball spin value is compared with a low level ball spin value. If the ball spin value exceeds the low level ball spin value, the ball spin is treated as a mid level ball spin. Accordingly, in second range establishment 1204, the list of materials of the golf ball's cover is set to a mid range. If the ball spin value does not exceed the low level ball spin value, the ball spin is treated as a low level ball spin. Accordingly, in third range establishment 1206, the list of materials of the golf ball's cover is set to a low range.

Figure 8A:
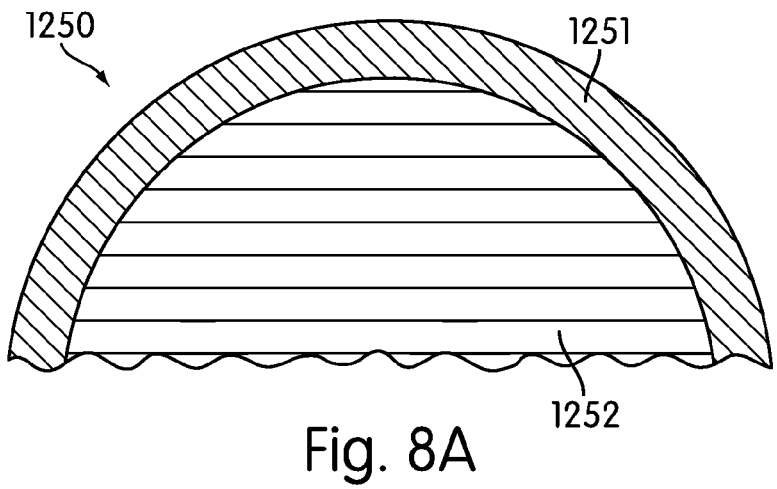
FIGS. 8A-8C are schematic cross-sectional views of portions of golf balls having a variety of cover hardnesses and cover materials.
Figure 8B:
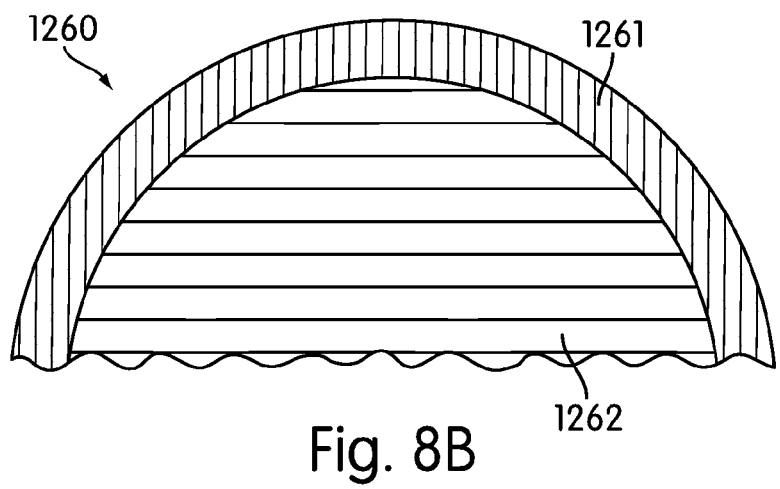
Figure 8C:
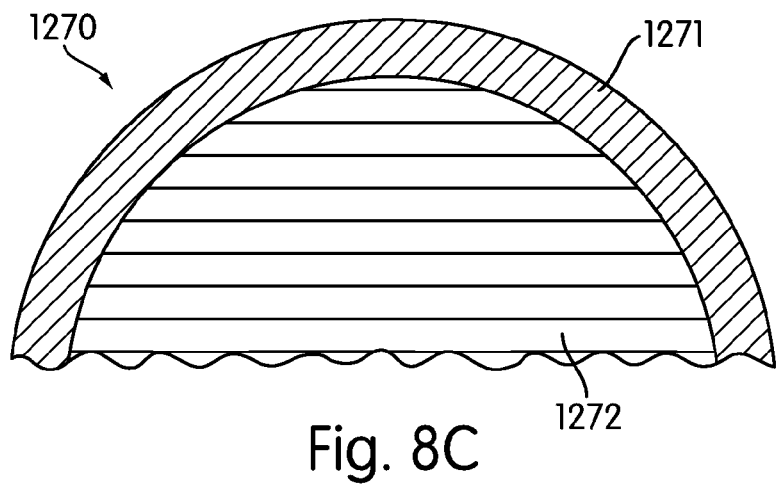

FIGS. 8A-8C are schematic cross-sectional views of portions of golf balls having a variety of cover hardnesses and cover materials. Golf ball 1250 incorporates cover layer 1251 and inner portion 1252. Cover layer 1251 may be formed of a material having a first hardness. Golf ball 1260 incorporates cover layer 1261 and inner portion 1262. Cover layer 1261 may be formed of a material having a second hardness less than the first hardness. Golf ball 1270 incorporates cover layer 1271 and inner portion 1272. Cover layer 1271 may be formed of a material having a third hardness less than second hardness.

In some embodiments of second step 1200, the mid level ball spin value may be approximately 3300 RPM (revolutions per minute), and the low level ball spin value may be approximately 2800 RPM. In addition, the high range of the list of materials of the golf ball's cover may be a set including urethane having a Shore-D hardness of approximately 60 (i.e., a Type D Shore Durometer hardness of approximately 60) and an ionomer or ionomer blend having a Shore-D hardness of approximately 70, the mid range may be a set including urethane having a Shore-D hardness of approximately 50 and an ionomer or ionomer blend having a Shore-D hardness of approximately 60, and the low range may be a set including urethane having a Shore-D hardness of approximately 40 and an ionomer or ionomer blend having a Shore-D hardness of approximately 50.

Accordingly, in second step 1200, the list of materials of the golf ball's cover may be a set including (a) material of a first hardness, like the hardness of cover layer 1251 (for example, a 60 Shore-D hardness urethane or a 70 Shore-D hardness ionomer or ionomer blend), for ball spin values above 3300 RPM; (b) material of a second hardness, like the hardness of cover layer 1261 (for example, a 50 Shore-D hardness urethane or a 60 Shore-D hardness ionomer or ionomer blend), for ball spin values between 3300 RPM and 2800 RPM; or (c) material of a third hardness, like the hardness of cover layer 1271 (for example, a 40 Shore-D hardness urethane or a 50 Shore-D hardness ionomer or ionomer blend), for ball spin values below 2800 RPM.

In some embodiments, a list of materials of the golf ball's cover may alternatively, or additionally, be based upon comparisons with another golf shot parameter value, such as a ball spin slope value. That is, a first measurement related to a spin of a golf ball may be obtained with respect to a first type of club used for longer-distance golf shots (for example, a driver) and a second measurement related to a spin of a golf ball may be obtained with respect to a second type of club used for shorter-distance golf shots (for example, a wedge). The ball spin slope is the ratio of the second measurement to the first measurement.

In such alternative embodiments, ball spin slope values based upon measurements related to ball speed slope may be compared to various ball spin slope values to influence the list of materials of the golf ball's cover. For example, the list of materials of the golf ball's cover may be adjusted to target a minimum ball spin slope of 2 (i.e., to target a ball spin rate with respect to wedges that is at least 2 times the ball spin rate with respect to drivers). Additionally, this adjustment may attempt to minimize impact upon the ball spin rate with respect to the type of club for which a golfer experiences greater performance, and impact instead the ball spin rate with respect to the type of club for which a golfer experiences lesser performance. For example, if a golfer experiences better performance with a driver than with a wedge, the list of materials of the golf ball's cover might be adjusted to minimize impact upon ball spin related to drivers in favor of impacting ball spin related to wedges.

Furthermore, in various embodiments, the material of any piece or layer for a golf ball construction may be determined in a manner similar to the method depicted in FIG. 7. That is, for any piece or layer for a golf ball construction, comparisons may be made between a golf shot parameter value corresponding with that piece or layer of golf ball construction and mid-level and low-level values of that golf shot parameter in order to establish a list of materials (and hardnesses of each material) for use in that particular piece or layer.

Figure 9:
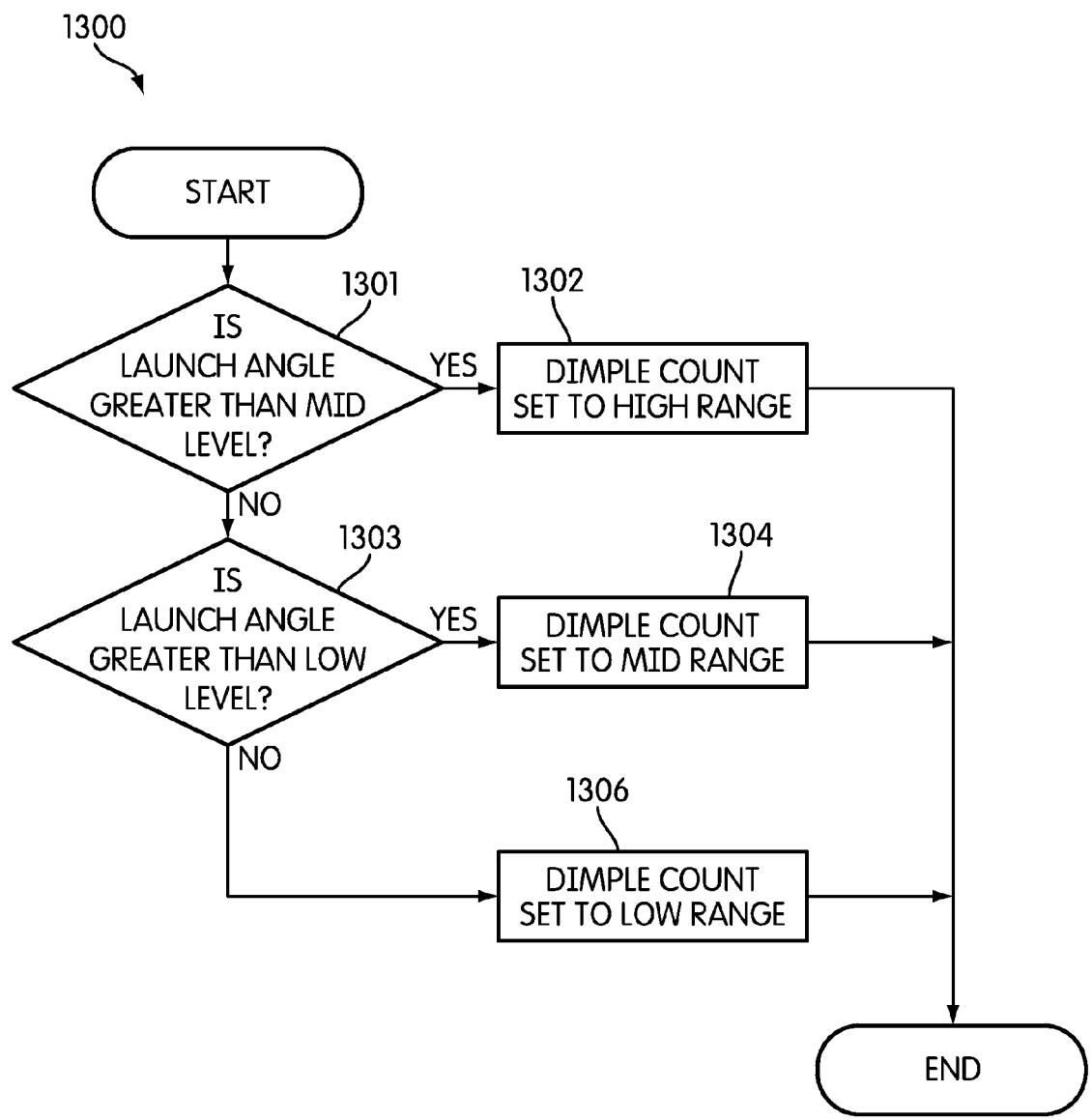
FIG. 9 is a flow diagram for a method of determining a number of dimples in a cover for a golf ball construction.

FIG. 9 is a flow diagram for a method of determining a number of dimples in a cover for a golf ball construction. In the depicted embodiment, third step 1300 includes a number of calculations based upon comparisons with a golf shot parameter value, such as a launch angle value, as well as a number of range-establishing steps on the basis of the calculations. The launch angle value is itself based at least upon a measurement related to a launch angle, which may be gathered by one or more measuring devices.

In first calculation 1301, the launch angle value is compared with a mid level launch angle value. If the launch angle value exceeds the mid level launch angle value, the launch angle is treated as a high level launch angle. Accordingly, in first range establishment 1302, the range for the number of dimples in the golf ball's cover is set to a high range. If the launch angle value does not exceed the mid level launch angle value, then in second calculation 1303 the launch angle value is compared with a low level launch angle value. If the launch angle value exceeds the low level launch angle value, the launch angle is treated as a mid level launch angle. Accordingly, in second range establishment 1304, the range for the number of dimples in the golf ball's cover is set to a mid range. If the launch angle value does not exceed the low level launch angle value, the launch angle is treated as a low level launch angle. Accordingly, in third range establishment 1306, the range for the number of dimples in the golf ball's cover is set to a low range.

Figure 10A:
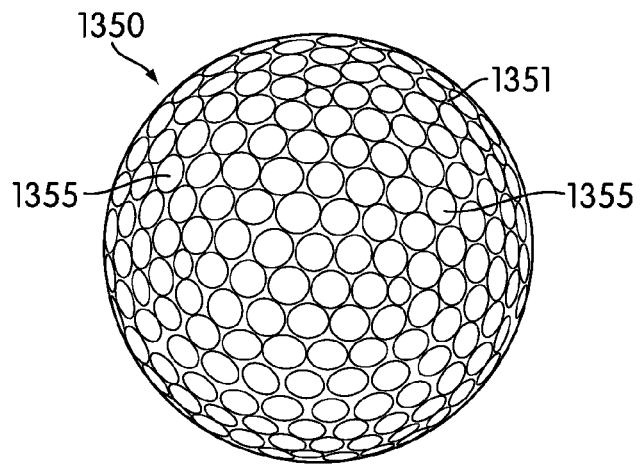
FIGS. 10A-10C are schematic plan views of golf balls having a variety of dimple counts.
Figure 10B:
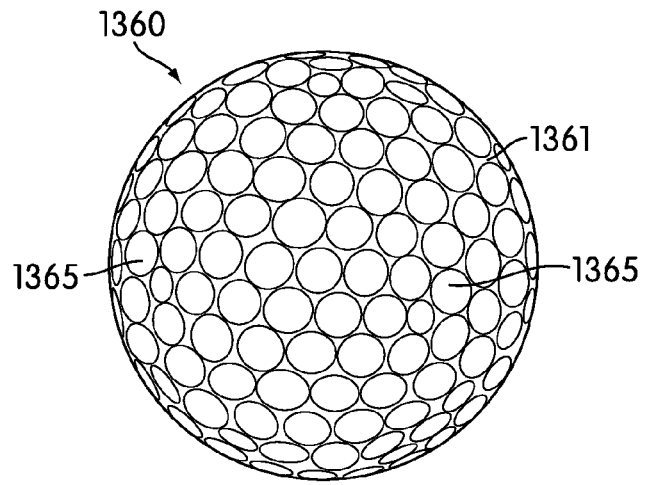
Figure 10C:
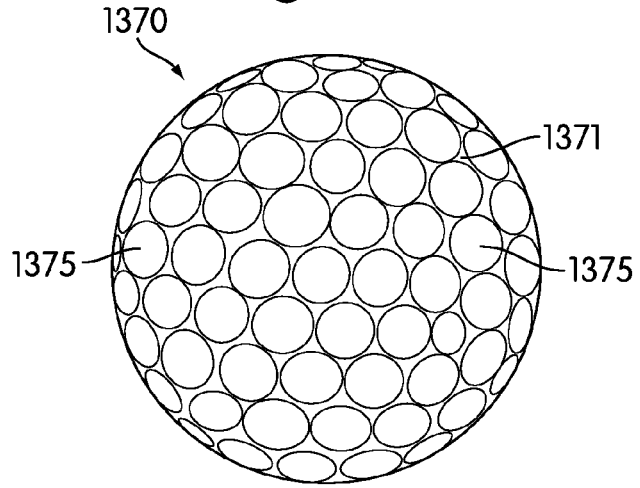

FIGS. 10A-10C are schematic plan views of golf balls having a variety of dimple counts. Golf ball 1350 incorporates cover layer 1351 having dimples 1355. Cover layer 1351 may have a first number of dimples 1355. Golf ball 1360 incorporates cover layer 1361 having dimples 1365. Cover layer 1361 may have a second number of dimples 1365 less than the first number of dimples 1355. Golf ball 1370 incorporates cover layer 1371 having dimples 1375. Cover layer 1371 may have a third number of dimples 1375 less than the second number of dimples 1365.

In some embodiments of third step 1300, the mid level launch angle value may be approximately 13 degrees, and the low level launch angle value may be approximately 10 degrees. In addition, the high range of the number of dimples in the golf ball's cover may be set to 400 or more, the mid range may be set to between 330 and 400, and the low range may be set to between 270 and 360.

Accordingly, in third step 1300, the range for the number of dimples in the golf ball's cover may be essentially set to include (a) a first number (for example, 400 or more), like the number of dimples 1355 of cover layer 1351, for launch angle values above 13 degrees; (b) a second number (for example, between 330 and 400), like the number of dimples 1365 of cover layer 1361, for launch angle values between 13 degrees and 10 degrees; or (c) a third number (for example, between 270 and 360), like the number of dimples 1375 of cover layer 1371, for launch angle values below 10 degrees.

In some embodiments, a number of dimples in a golf ball's cover may alternatively, or additionally, be based upon comparisons with another golf shot parameter value, such as a composite value combining launch angle and spin rate. For example, a measurement related to launch angle may be multiplied by a measurement related to spin rate to determine a composite value combining launch angle and spin rate.

In such alternative embodiments, composite values combining launch angle and spin rate may be compared to various values to influence the number of dimples in a golf ball's cover. For example, a low level composite value combining launch angle and spin rate may be set to approximately 24,000, and a mid level composite value combining launch angle and spin rate may be set to approximately 30,800. Accordingly, the range for the number of dimples in the golf ball's cover may essentially be set to include (a) a first number (for example, 400 or more) for composite value combining launch angle and spin rate above 30,800; (b) a second number (for example, between 330 and 400) for composite value combining launch angle and spin rate between 24,000 and 30,800; and (c) a third number (for example, between 270 and 360) for composite value combining launch angle and spin rate below 24,000.

Figure 11:
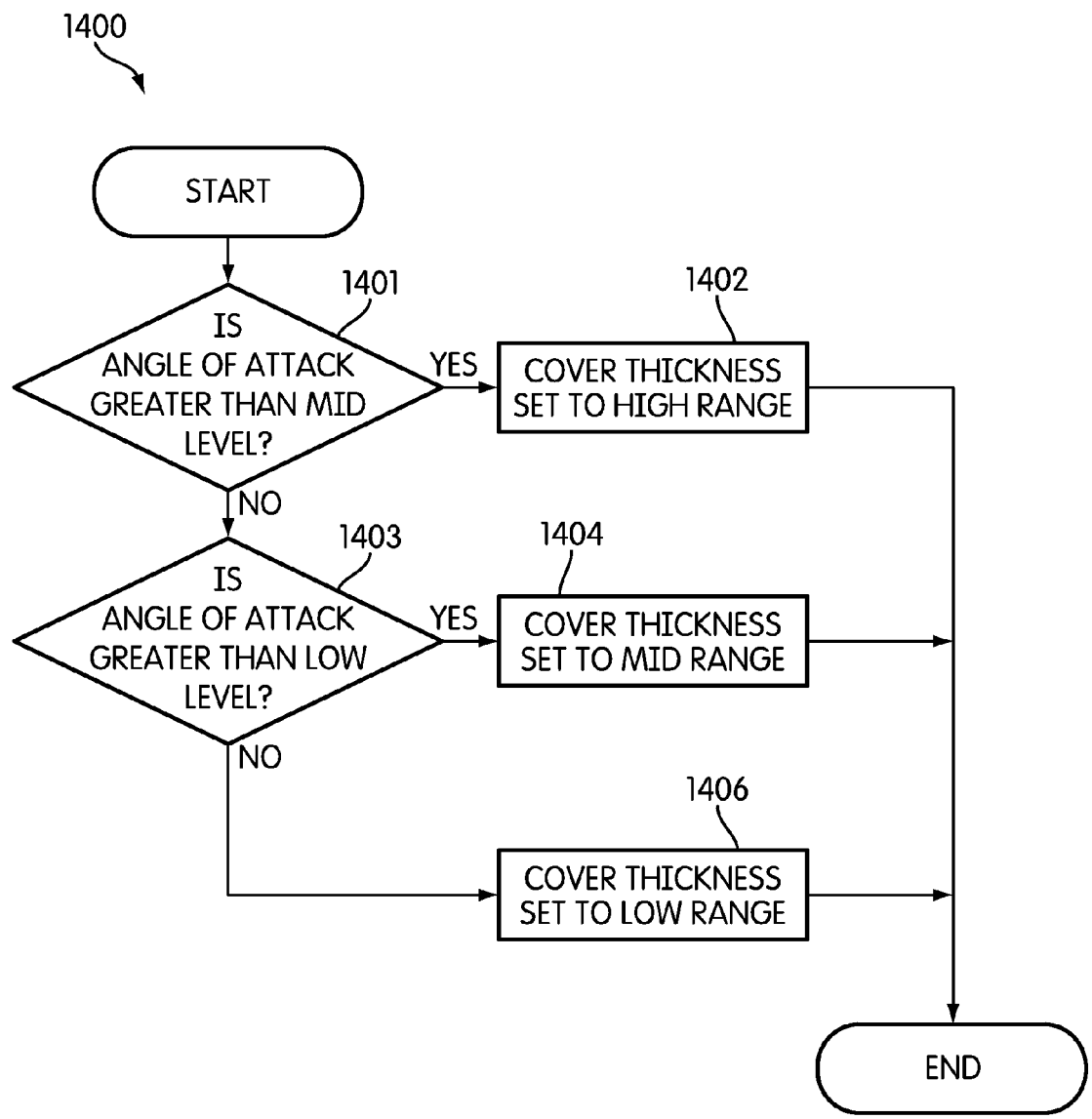
FIG. 11 is a flow diagram for a method of determining a cover thickness for a golf ball construction.

FIG. 11 is a flow diagram for a method of determining a cover thickness for a golf ball construction. In the depicted embodiment, third step 1400 includes a number of calculations based upon comparisons with a golf shot parameter value, such as an attack angle value, as well as a number of range-establishing steps on the basis of the calculations. The attack angle value is itself based at least upon a measurement related to an attack angle of a golf shot, which may be gathered by one or more measuring devices.

In first calculation 1401, the attack angle value is compared with a mid level attack angle value. If the attack angle value exceeds the mid level attack angle value, the attack angle is treated as a high level attack angle (which may include positive, upward, high, and shallow attack angles). Accordingly, in first range establishment 1402, the range for the thickness of the golf ball's cover is set to a high range. If the attack angle value does not exceed the mid level attack angle value, then in second calculation 1403 the attack angle value is compared with a low level attack angle value. If the attack angle value exceeds the low level attack angle value, the attack angle is treated as a mid level attack angle (which may include neutral, flat, and shallow attack angles). Accordingly, in second range establishment 1404, the range for the thickness of the golf ball's cover is set to a mid range. If the attack angle value does not exceed the low level attack angle value, the attack angle is treated as a low level attack angle (which may include negative or steep attack angles). Accordingly, in third range establishment 1406, the range for the thickness of the golf ball's cover is set to a low range.

Figure 12A:
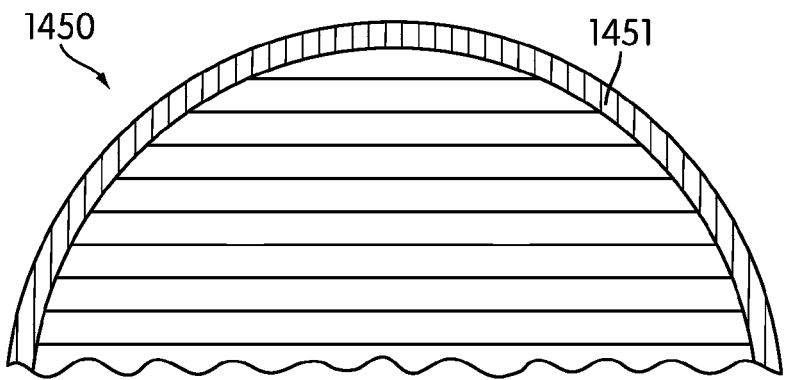
FIGS. 12A-12C are schematic cross-sectional views of portions of golf balls having a variety of cover thicknesses.
Figure 12B:
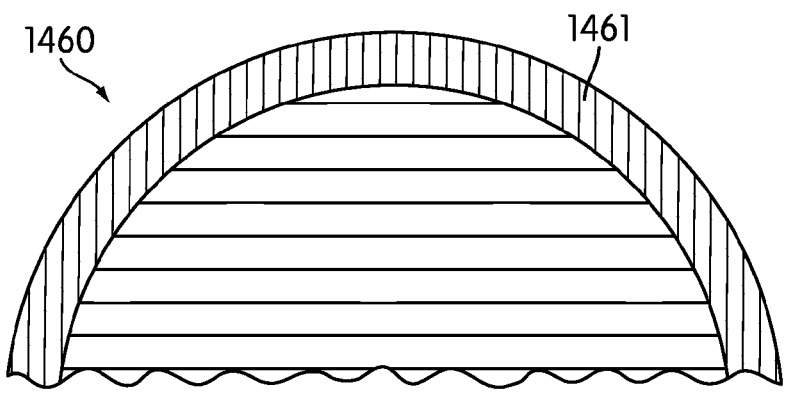
Figure 12C:
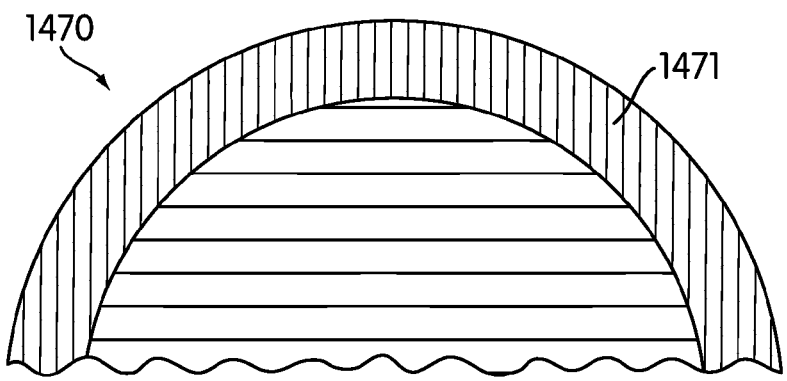

FIGS. 12A-12C are schematic cross-sectional views of portions of golf balls having a variety of cover thicknesses. Golf ball 1450 incorporates cover layer 1451 and inner portion 1452. Cover layer 1451 may have a first thickness. Golf ball 1460 incorporates cover layer 1461 and inner portion 1462. Cover layer 1461 may have a second thickness greater than the first thickness. Golf ball 1470 incorporates cover layer 1471 and inner portion 1472. Cover layer 1471 may have a third thickness greater than the second thickness.

Accordingly, in fourth step 1400, the range for the thickness of the golf ball's cover may be essentially set to include (a) a first thickness, like the thickness of cover layer 1451, for high level attack angles; (b) a second thickness, like the thickness of cover layer 1461, for mid level attack angles; or (c) a third thickness, like the thickness of cover layer 1471, for low level attack angles. Alternatively, in fourth step 1400, the ranges of thickness for the golf ball's cover may be otherwise associated with attack angles. For example, the range for the thickness of the golf ball's cover may be essentially set to include (a) a first thickness, like the thickness of cover layer 1471, for high level attack angles; (b) a second thickness, like the thickness of cover layer 1461, for mid level attack angles; or (c) a third thickness, like the thickness of cover layer 1451, for low level attack angles.

In some embodiments of third step 1400, which may correspond with measurements obtained when the golf club is a driver, the mid level attack angle value may be about 4.0 degrees, and the low level attack angle value may be about 0.0 degrees. In other embodiments of third step 1400, which may correspond with measurements obtained when the golf club is a 7 iron, the mid level attack angle value may be about −1.0 degree, and the low level attack angle value may be about −3.5 degrees. In addition, the high range of the thickness for the golf ball's cover may be set to include about 0.6 mm to 0.8 mm, the mid range of the thickness for the golf ball's cover may be set to include about 0.8 mm to 1.0, and the low range of the thickness for the golf ball's cover may be set to include about 1.0 mm to 2.3 mm.

Accordingly, in various steps, method 1000 may obtain a plurality of measurements related to golf shot parameters and calculate a range of values for each of a plurality of golf ball construction characteristics. The calculation of each range of values may be based upon a golf shot parameter value which is itself based at least upon a corresponding measurement from the obtained plurality of measurements related to golf shot parameters. More particularly, in first step 1100, method 1000 may calculate a range of values for a first golf ball construction characteristic based upon a first golf shot parameter value of the plurality of golf shot parameter values. Similarly, in second step 1200, method 1000 may calculate a range of values for a second golf ball construction characteristic based upon a second golf shot parameter value of the plurality of golf shot parameter values. Proceeding, in third step 1300, method 1000 may calculate a range of values for a third golf ball construction characteristic based upon a third golf shot parameter value of the plurality of golf shot parameter values. Subsequently, in fourth step 1400, method 1000 may calculate a range of values for a fourth golf ball construction characteristic based upon a fourth golf shot parameter value of the plurality of golf shot parameter values.

Any of the plurality of golf shot parameter values used by method 1000 in its calculations may be obtained by system 2000. For example, a first golf shot parameter value may be based at least upon a measurement gathered by first measuring device 2100, a second golf shot parameter value may be based at least upon a measurement gathered by second measuring device 2200, a third golf shot parameter value may be based at least upon a measurement gathered by third measuring device 2300, or a fourth golf shot parameter value may be based at least upon a measurement gathered by fourth device measuring 2400.

After obtaining the plurality of golf shot parameter values, and after having calculated ranges of values for each of a plurality of golf ball construction characteristics based upon the plurality of golf shot parameter values, the combination of the ranges of values for each of the plurality of golf ball construction characteristics may delimit a range of golf ball constructions. Where the range for each of the constituent golf ball construction characteristics includes a single configuration or value, the delimited range of golf ball constructions may include a single golf ball construction. Alternatively, where one or more of the ranges for each of the constituent golf ball construction characteristics includes more than one configuration or value, the delimited range of golf ball constructions may include more than a single golf ball construction.

Figure 13:
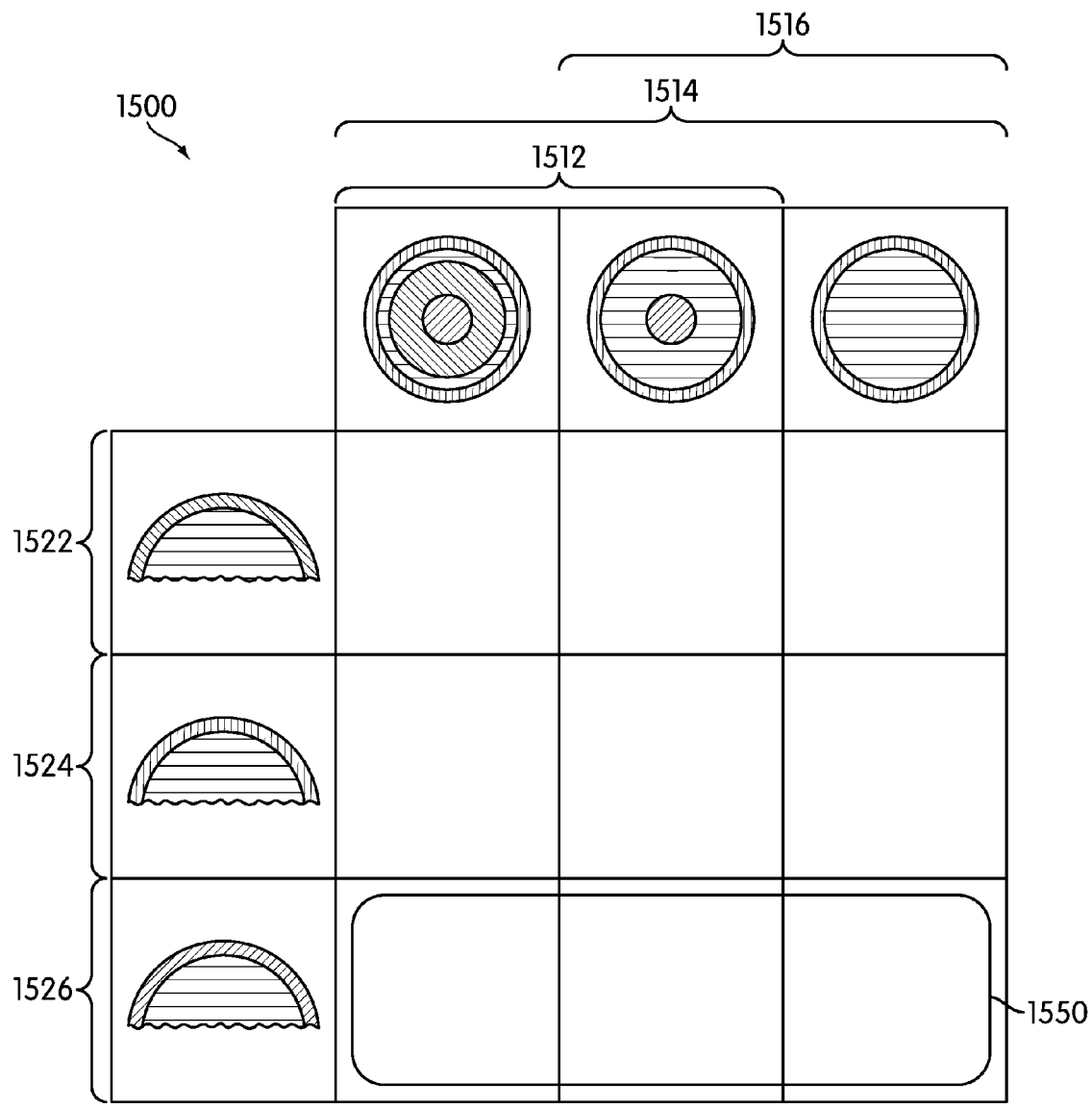
FIG. 13 is an embodiment of a range of golf ball constructions.

In a simplified example, FIG. 13 is an embodiment of a range of golf ball constructions. As depicted, range of golf ball constructions 1500 has two constituent golf ball construction characteristics. With respect to the first golf ball construction characteristic, each of first range 1512, second range 1514, and third range 1516 includes more than one configuration or value, depicted as columns in FIG. 13. That is, each of ranges 1512, 1514, and 1516 includes a range of configurations or values. In contrast, with respect to the second golf ball construction characteristic, each of first range 1522, second range 1524, and third range 1526 does not include more than one configuration or value, depicted as rows in FIG. 13. That is, each of ranges 1522, 1524, and 1526 includes a single configuration or value.

Under a method for specifying a range of golf ball constructions similar to method 1000, various golf shot parameter values of a plurality of golf shot parameter values may be used to calculate ranges of values for each of the two golf ball construction characteristics of range of golf ball constructions 1500. For example, a first step of the method may calculate second range 1514 as an appropriate range for the first golf ball construction characteristic based upon a first golf shot parameter value. Similarly, a second step of the method may calculate third range 1526 as an appropriate range for the second golf ball construction characteristic based upon a second golf shot parameter value. Subsequently, the combination of second range 1514 for the first golf ball construction characteristic and third range 1526 for the second golf ball construction characteristic may be used to determine delimited range of golf ball constructions 1550.

Figure 14:
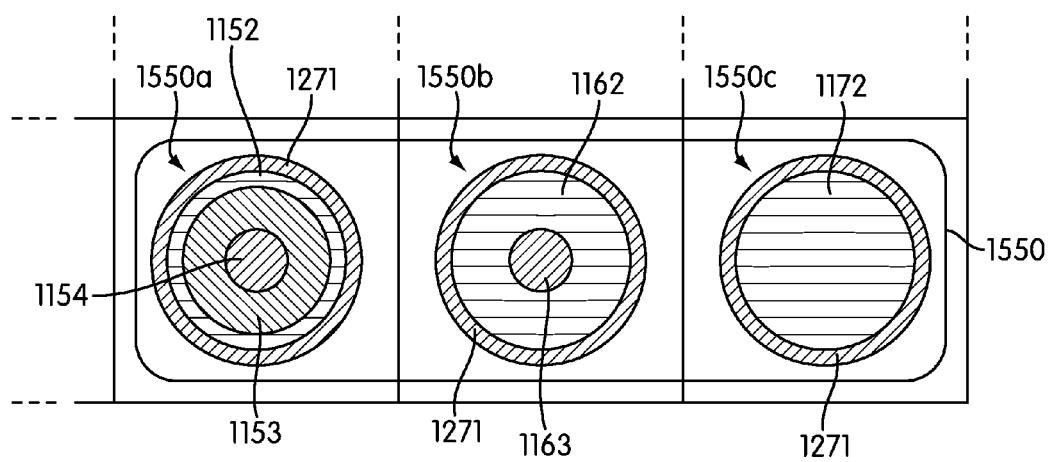
FIG. 14 is an embodiment of the delimited range of golf ball constructions of FIG. 13.

FIG. 14 is an embodiment of the delimited range of golf ball constructions of FIG. 13. Delimited range 1550 includes first delimited golf ball construction 1550a, second delimited golf ball construction 1550b, and third delimited golf ball construction 1550c. That is, delimited range of golf ball constructions 1550 comprises the first and second golf ball construction characteristics that have been determined on the basis of the first and second golf shot parameter values.

Where there is such a range of golf ball constructions, another factor may be used to preferentially select a single golf ball construction from the range of golf ball constructions. Preference factors for selecting single golf ball constructions may include, for example, a factor based upon cost, or a factor based upon durability, or a factor based upon feel.

Figure 15:
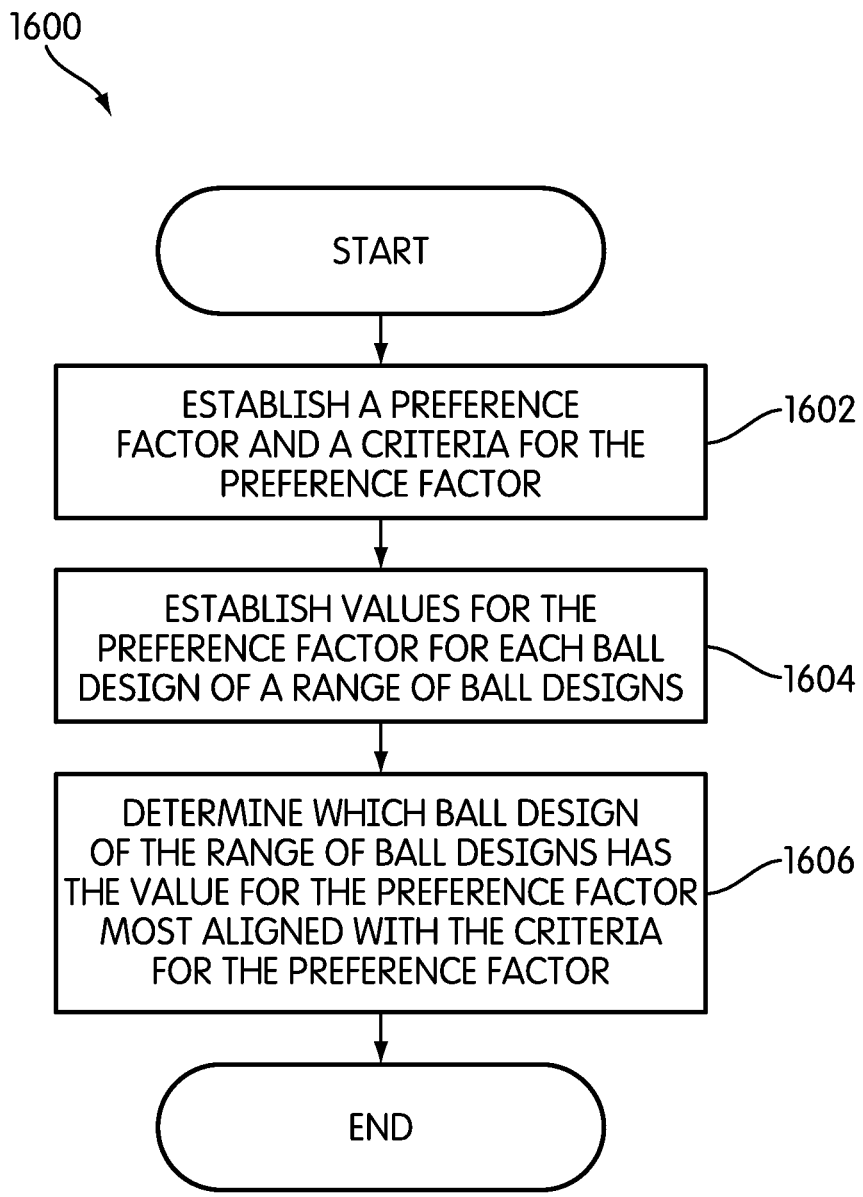
FIG. 15 is a flow diagram for a method of reducing a range of golf ball constructions based upon a preference factor.

FIG. 15 is a flow diagram for a method 1600 of reducing a range of golf ball constructions based upon a preference factor. In first step 1602, a preference factor is established, as well as a criterion for the preference factor. For example, the established preference factor might be cost, and the criteria might be that the cost of the golf ball construction is minimized. In second step 1604, a value for the preference factor is established for each golf ball construction of the delimited range of golf ball constructions. For example, a cost may be established for each golf ball construction of a delimited range of golf ball constructions. In third step 1606, the golf ball construction having the minimum cost among all the golf ball constructions in the delimited range of golf ball constructions is determined.

Figure 16:
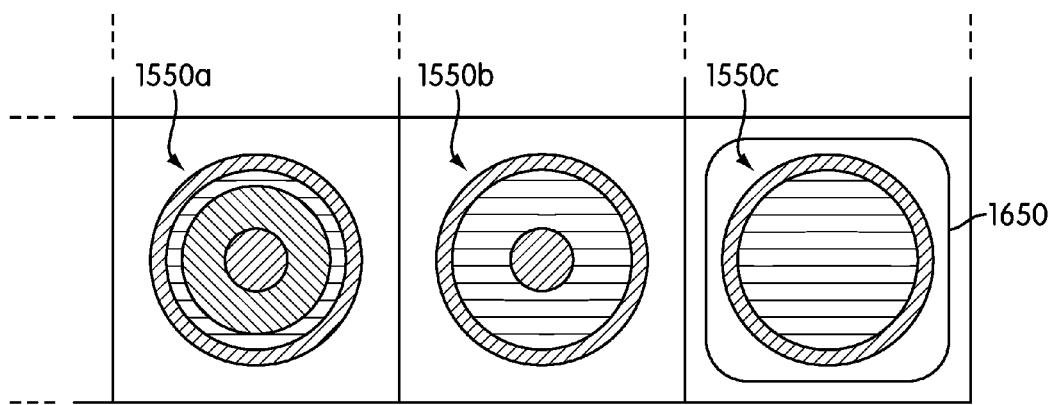
FIG. 16 is an embodiment of the delimited range of golf ball constructions of FIG. 13 reduced to a first golf ball construction under the method of FIG. 15.

Returning to the simplified example of FIGS. 13 and 14, FIG. 16 is an embodiment of the delimited range of golf ball constructions of FIG. 13 reduced to a first golf ball construction under the method depicted in FIG. 15. In first step 1602, cost is established as a preference factor, and the minimization of the cost of the golf ball construction is established as the criteria. In second step 1604, values are assigned for the costs of first delimited golf ball construction 1550a, second delimited golf ball construction 1550b, and third delimited golf ball construction 1550c. In third step 1606, third delimited golf ball construction 1550c is determined to have the minimum cost of golf ball constructions 1550a, 1550b, and 1550c. Accordingly, delimited range 1550 of golf ball constructions is reduced to golf ball construction 1650 (i.e., golf ball construction 1550c).

Automation

In some embodiments, method 1000 may be executed by a computer, or method 1000 and system 2000 may be included in a golf ball design system for a computer. Such embodiments may include a database for storing a plurality of golf shot parameter values. Additionally, in such embodiments, one or more of first measuring device 2100, second measuring device 2200, third measuring device 2300, or fourth measuring device 2400 may be automated. That is, any of devices 2100, 2200, 2300, or 2400 may automatically obtain one or more golf shot parameter values. Such measuring devices may include photographic devices, launch monitors, sound monitors, position-measuring devices, cameras, video cameras, light sensors, other light-measuring devices, radar devices (e.g., doppler radar devices, devices that give information similar to doppler radar devices, and other radar devices), sonar devices, other devices measuring reflected energy, a receiving device, or a transmitting device.

Such embodiments may also include one or more inputting devices for inputting the golf shot parameter values into the computer. For example, some embodiments may include one inputting device for each of devices 2100, 2200, 2300, and 2400. Alternatively, in other embodiments, a single inputting device may serve to input golf shot parameter values from more than one of devices 2100, 2200, 2300, and 2400 into the computer. That is, the inputting device for more than one of devices 2100, 2200, 2300, and 2400 may be the same device. Such inputting devices may include cables, wires, other electrical connections, or devices implementing any wired or wireless communication protocol.

Such embodiments may additionally include devices for determining the range of values for each of a plurality of golf ball construction characteristics based upon the golf shot parameter values. For example, a first determining device may determine a range of values for a first golf ball construction characteristic based upon the first golf shot parameter value, a second determining device may determine a range of values for a second golf ball construction characteristic based upon the second golf shot parameter value, and so on. Alternatively, in other embodiments, a single determining device may serve to determine a range of values for more than one golf ball construction characteristic. Such determining devices may include CPU's, GPU's, or any other data-processing or computing device.

Such embodiments may also include a delimiting device for delimiting a range of golf ball construction based upon ranges of values for each of the golf ball construction characteristics, like a CPU, GPU, or any other data-processing or computing device. Such embodiments may further include an input device for inputting one or more golf ball construction preferences, like a keyboard, mouse, microphone, or other input device, and may further include a reducing device for reducing the delimited range of golf ball constructions based upon the inputted golf ball construction preference or preferences, like a CPU, GPU, or any other data-processing or computing device. Finally, such embodiments may include an output device for outputting a delimited range of golf ball constructions or a reduced range of golf ball constructions, like a printer, monitor, hard disk, or any other output or storage device.

In various embodiments, system 2000 may be or may include portions of a ball fitting system as disclosed in copending and commonly owned U.S. Pat. No. 8,758,169, currently U.S. patent application Ser. No. 12/498,364, entitled "Method and System for Golf Ball Fitting Analysis," and filed on Jul. 7, 2009, which is herein incorporated by reference. System 200 may include a computer, which may include, but is not limited to: a desktop computer, portable computer, tablet computer, smartphone, and/or any other device including a processor and/or a display that is configured to allow a user to view and/or interact with information. The computer may, in turn, include a CPU, a memory, a display, and a data transfer connection.

Further Embodiments

As depicted in FIGS. 3-16, method 1000 and system 2000 may be used first to delimit a range of golf ball constructions, then to reduce the delimited range of golf ball constructions to a single golf ball construction. In other embodiments, method 1000 may further comprise a step of placing an order for the manufacture of the single golf ball construction. Alternatively, method 1000 may further comprise a step of manufacturing a golf ball construction based upon the single golf ball construction. In still further embodiments, method 1000 may further comprise a step of receiving a golf ball manufactured based upon the first golf ball construction.

As depicted in FIGS. 3-16, method 1000 includes four steps to determine four golf ball construction characteristics. Similarly, system 2000 includes four devices to obtain four golf shot parameter values. However, in other embodiments, method 1000 may include a greater number of steps to determine a greater number of golf ball construction characteristics, or may include fewer steps to determine fewer golf ball construction characteristics. Similarly, in other embodiments, system 1000 may include a greater number of devices to obtain a greater number of golf shot parameter values, or may include fewer devices to obtain fewer golf shot parameter values.

As depicted in FIGS. 3-16, method 1000 includes first step 1000 to determine a number of layers, followed by second step 1200 to determine a cover material, followed by third step 1300 to determine a dimple count, followed by fourth step 1400 to determine a cover thickness. However, in other embodiments, the steps of method 1000 may be performed in any other order. In addition, any of the steps of method 1000 may be performed at the same time as any of the other steps.

As depicted in FIGS. 3-12, first step 1100 determines a range for a number of layers on the basis of swing speed, second step 1200 determines a list of materials for the golf ball's cover on the basis of ball spin, third step 1300 determines a range for the number of dimples in a golf ball's cover on the basis of launch angle, and fourth step 1400 determines a range for the thickness of a golf ball's cover on the basis of attack angle. In other embodiments, any of the golf ball construction characteristics of a plurality of golf ball construction characteristics constituting a golf ball construction or range of golf ball constructions may be based on measurements related to any golf shot parameter value.

As depicted in FIG. 4, each of first measuring device 2100, second measuring device 2200, third measuring device 2300, and fourth measuring device 2400 obtains measurements related to one golf shot parameter value. However, in other embodiments, any of devices 2100, 2200, 2300, or 2400 may obtain measurements related to more than one golf shot parameter value. For example, in some embodiments, a single device may obtain all golf shot parameter values used in method 1000.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method comprising:
receiving at a device a plurality of golf shot parameter values from a sensor in communication with the device;
determining using the device a range of values for each of a plurality of golf ball construction characteristics, the calculation of each range of values being based upon a corresponding value from the plurality of golf shot parameter values;
combining using the device the range of values for each of the plurality of golf ball construction characteristics to delimit a range of golf ball constructions;
receiving at the device a golf ball construction preference; and
reducing using the device the range of golf ball constructions based upon the golf ball construction preference and outputting using the device at least one golf ball construction based upon the golf ball construction preference.

2. The method of claim 1, further comprising obtaining the plurality of golf shot parameter values using the sensor.

3. The method of claim 2, wherein obtaining the plurality of golf shot parameter values includes sensing using the sensor at least one of a swing parameter and a launch condition parameter of a golf swing.

4. The method of claim 3, wherein sensing the swing parameter includes sensing by the sensor at least one of a swing speed, a club path, and an attack angle.

5. The method of claim 3, wherein sensing the launch condition parameter includes sensing by the sensor at least one of a launch angle, a ball speed, a ball spin, an initial ball direction, and a ball spin slope.

6. The method of claim 1, wherein receiving the plurality of golf shot parameter values includes receiving at least one of a swing speed, a ball compression, a ball speed or velocity, a ball spin rate, an attack angle, a club path, and a launch angle.

7. The method of claim 1, wherein determining the range of values for each of the plurality of golf ball construction characteristics includes determining at least one of a number of layers, a cover hardness, a cover material, and a dimple count.

8. The method of claim 1, wherein determining the range of values for each of the plurality of golf ball construction characteristics includes determining a range of a number of layers based on one of a swing speed, a ball compression, and a ball speed or velocity.

9. The method of claim 1, wherein determining the range of values for each of the plurality of golf ball construction characteristics includes determining a range of at least one of a cover hardness and a cover material based on at least one of a ball spin rate and a ball spin rate slope.

10. The method of claim 1, wherein determining the range of values for each of the plurality of golf ball construction characteristics includes determining a range of a dimple count based on at least one of a launch angle and a spin rate.

11. The method of claim 1, wherein receiving the golf ball construction preference includes receiving information regarding preferences based on at least one of cost, durability, sound, and feel.

12. The method of claim 1, wherein reducing the range of golf ball constructions includes reducing using the device the range of golf ball constructions to a first golf ball construction.

13. The method of claim 12, further comprising placing an order for the manufacture of a golf ball based on the first golf ball construction.

14. The method of claim 12, further comprising manufacturing a golf ball based on the first golf ball construction.

15. A golf ball design system including a computer comprising:
   a computer database for storing a plurality of golf shot parameter values;
   a first automated measurement device for obtaining a first measurement related to a first golf shot parameter value;
   a first input device for inputting the first measurement into the computer;
   a first computer determining device for determining a range of values for a first golf ball construction characteristic based upon the first measurement;
   a second automated measurement device for obtaining a second measurement related to a second golf shot parameter value;
   a second input device for inputting the second measurement into the computer;
   a second computer determining device for determining a range of values for a second golf ball construction characteristic based upon the second measurement;
   a computer delimiting device for delimiting a range of golf ball constructions based upon the range of values for the first golf ball construction characteristic and the range of values for the second golf ball construction characteristic; and
   an output device for outputting from the computer the range of golf ball constructions.

16. The system of claim 15, wherein one of the first automated measurement device and the second automated measurement device includes one of a camera, a launch monitor, and a sound monitor.

17. The system of claim 15, further including an input device for inputting one or more golf ball construction preferences.

18. The system of claim 17, further including a reducing device for reducing the range of golf ball constructions based upon the one or more golf ball construction preferences.

19. A method for specifying a golf ball construction to be executed by a device, the method comprising the steps of:
   receiving at the device a plurality of golf shot parameter values;
   determining using the device a range of values for each of a plurality of golf ball construction characteristics, each range of values being based upon a corresponding value from the plurality of golf shot parameter values;
   receiving at the device at least one golf ball construction preference;
   determining using the device the golf ball construction based on (a) the range of values for each of the plurality of golf ball construction characteristics and (b) the at least one golf ball construction preference, and
   manufacturing a golf ball having the golf ball construction.

* * * * *